(12) United States Patent
    Pic

(10) Patent No.: US 10,379,708 B2
(45) Date of Patent: Aug. 13, 2019

(54) GRAPHICAL USER INTERFACE FOR A COMMON INTEREST SOCIAL NETWORK

(71) Applicant: Mickael Pic, Pierrefonds (CA)

(72) Inventor: Mickael Pic, Pierrefonds (CA)

( * ) Notice: Subject to any disclaimer, the term of this patent is extended or adjusted under 35 U.S.C. 154(b) by 992 days.

(21) Appl. No.: 14/866,140

(22) Filed: Sep. 25, 2015

(65) Prior Publication Data

US 2016/0094684 A1    Mar. 31, 2016

Related U.S. Application Data

(60) Provisional application No. 62/056,251, filed on Sep. 26, 2014.

(51) Int. Cl.
  *G06F 15/16*    (2006.01)
  *G06F 3/0484*    (2013.01)
  *H04L 29/08*    (2006.01)
  *H04W 4/08*    (2009.01)
  *H04W 4/21*    (2018.01)
  *G06Q 50/00*    (2012.01)

(52) U.S. Cl.
  CPC .......... *G06F 3/0484* (2013.01); *G06Q 50/01* (2013.01); *H04L 67/306* (2013.01); *H04W 4/08* (2013.01); *H04W 4/21* (2018.02)

(58) Field of Classification Search
  CPC ...... G06F 3/0484; H04L 67/306; H04W 4/08; H04W 4/21
  See application file for complete search history.

(56) References Cited

U.S. PATENT DOCUMENTS

| 8,600,833 | B1 | 12/2013 | Liden |
| 8,700,629 | B2 | 4/2014 | Engel et al. |
| 8,725,796 | B2 | 5/2014 | Serena |
| 8,773,437 | B1 | 7/2014 | Goldman et al. |

(Continued)

FOREIGN PATENT DOCUMENTS

| CN | 103488678 | 1/2014 |
| CN | 102609465 | 4/2014 |

(Continued)

OTHER PUBLICATIONS http://en.wikipedia.org/wiki/Social_graph [printed: Dec. 23, 2015].

*Primary Examiner* — Normin Abedin
(74) *Attorney, Agent, or Firm* — Benoit & Cote, Inc.; C. Marc Benoit

(57) ABSTRACT

The present document describes a system for generating a graphical user interface for display by a client computer. The system comprises a server, with various components, for communicating with a plurality of client computers. The server is made to get in a database memory a plurality of pieces of conceptual information and a first threshold associated to a first user account, and a plurality of pieces of conceptual information and a second threshold associated to a second user account; to determine if the relative numbers of pieces of conceptual information that the first user account and the second user account have in common both exceed the first threshold and the second threshold, respectively; and to generate a graphical user interface dataset and sending the graphical user interface dataset to the first client computer for display, the graphical user interface suggesting a connection to the second user account.

9 Claims, 11 Drawing Sheets

(56) References Cited

U.S. PATENT DOCUMENTS

| | | |
|---|---|---|
| 8,825,802 B2 | 9/2014 | Pearce |
| 2006/0218153 A1 | 9/2006 | Voon et al. |
| 2008/0005073 A1 | 1/2008 | Meek et al. |
| 2008/0270038 A1 | 10/2008 | Partovi et al. |
| 2009/0075738 A1 | 3/2009 | Pearce |
| 2012/0096088 A1 | 4/2012 | Fahmy |
| 2012/0297038 A1 | 11/2012 | Mei et al. |
| 2012/0331055 A1 | 12/2012 | Cross et al. |
| 2013/0066967 A1 | 3/2013 | Alexander |
| 2013/0167085 A1 | 6/2013 | Roundtree et al. |
| 2013/0254305 A1 | 9/2013 | Cheng et al. |
| 2013/0262332 A1 | 10/2013 | Moon et al. |
| 2013/0311572 A1 | 11/2013 | Faller et al. |
| 2013/0311906 A1 | 11/2013 | Mackin |
| 2013/0318162 A1 | 11/2013 | Wright et al. |
| 2014/0101243 A1 | 4/2014 | Naveh et al. |
| 2014/0108386 A1 | 4/2014 | Andler et al. |
| 2014/0129292 A1 | 5/2014 | Ruvini |
| 2014/0181208 A1 | 6/2014 | Robinson et al. |
| 2014/0189530 A1 | 7/2014 | Anand et al. |
| 2014/0222806 A1 | 8/2014 | Carbonell et al. |
| 2014/0257922 A1 | 9/2014 | Jouhikainen et al. |
| 2014/0258287 A1* | 9/2014 | Zhu ................. G06Q 50/01 707/732 |

FOREIGN PATENT DOCUMENTS

| | | |
|---|---|---|
| EP | 2151793 | 2/2010 |
| EP | 2688034 | 1/2014 |
| KR | 1020140087065 | 7/2014 |
| WO | WO 2005074445 | 8/2005 |
| WO | WO 2011064448 | 6/2011 |
| WO | WO 2012088591 | 7/2012 |
| WO | WO 2013029816 | 3/2013 |
| WO | WO 2013097026 | 7/2013 |
| WO | WO 2013107690 | 7/2013 |
| WO | WO 2014028060 | 2/2014 |
| WO | WO 2014062202 | 4/2014 |
| WO | WO 2014096137 | 6/2014 |
| WO | WO 2014138158 | 9/2014 |

\* cited by examiner

GRAPHICAL USER INTERFACE FOR A COMMON INTEREST SOCIAL NETWORK

BACKGROUND

(a) Field

The subject matter disclosed generally relates to graphical user interfaces. More specifically, it relates to a graphical user interface of which both contents and structure depend on the inputs provided to a server by a plurality of client computers.

(b) Related Prior Art

Computer networks, which are formed by client computers communicating with remote servers, can be used for a variety of purposes, including so-called social networks. There are various social networks on the internet, some of them being widely used. Most of them are contact-based, meaning the users are encouraged to enter in contact with people they know, or people who are in the same professional networks or who have friends in common. Existing social connections, or the degree of social connections (number of intermediate connections), are usually what drive contact suggestions or new links in these networks.

However, few attempts have been directed to building a social network that would link people based only on the interests they share, regardless of social connections or location.

Furthermore, users are not usually allowed to set under which conditions or degree of compatibility they would like to be suggested to other users or to be shown suggested contacts. Moreover, all users are usually accessible to other users for connection. Low interest sharing does not prevent a user to connect with another one.

Existing networks can scan a user's email history and check if email recipients are also users of the network in order to suggest a connection to the user (e.g., as in LinkedIn). They can ask a user for a specific set of criteria, scan the database to find other users who match the criteria and suggest a connection between them (e.g., as in a dating site). They can check for the number of shared connections between two users and suggest a connection if they share many connections (e.g., as in Facebook). In these cases, the information being dealt with is factual, objective information.

However, when users of a network with no real-life connection whatsoever are willing to enter in communication with other people, how does the server determine that the accounts of two users are worth a potential connection?

A few documents are related to this issue, for example, U.S. Pat. No. 8,775,324B2, which describes compatibility scoring of users in a social network. However, no user-provided threshold is used to ensure that "picky" users are not shown too many connections prospects. Furthermore, U.S. Pat. No. 8,775,324B2 is not able to estimate compatibility without using social proximity (degree of separation). In US 2014/0222806 A1, no bi-directional threshold is provided.

Another issue is trying to represent conceptual information in a computer. Teaching a computer to know that concepts such as interests are related is a challenging task with no obvious answer. However, in another example, WO 2012/088591 A1, no user-provided threshold is used as part of a social network compatibility assessment between users.

There is therefore a need for a social network that could provide new ways of proposing connections between users to promote interest sharing as a driver for new connections. The server system implementing this social network should be able to discriminate among vast amounts of profiles using a bi-directional threshold provided by users, and use the interests, or more generally concepts expressed by the users, to assess their compatibility regardless of their social proximity on the social network or in real life.

SUMMARY

According to a first aspect of the invention, there is provided a system for generating a graphical user interface for display by a client computer, the system comprising:
 a server comprising a communication input/output (I/O) for communicating with a plurality of client computers, a database memory for storing a database, a memory for storing instructions thereon, and a processor operably connected to the communication I/O, the database memory and the memory for storing instructions, the instructions causing the processor to:
 receive, at the communication I/O, an indication that a first client computer is to be associated to a first user account;
 get in the database memory a plurality of pieces of conceptual information and a first threshold associated to the first user account, and a plurality of pieces of conceptual information and a second threshold associated to a second user account;
 determine if the number of pieces of conceptual information that the first user account and the second user account have in common relative to a total number of pieces of conceptual information associated to the first user account and the second user account, namely a first compatibility fraction and a second compatibility fraction, both exceed the first threshold and the second threshold, respectively;
 generate a graphical user interface dataset and sending the graphical user interface dataset to the first client computer which, if the determining is positive, causes the first client computer to display:
 an interface link, among other interface links appearing in the graphical user interface, suggesting a connection between the first user account and the second user account, the interface link having an appearance which is different from the other interface links; and
 a visual indication of at least one of the first compatibility fraction and the second compatibility fraction.

According to an embodiment, the instructions further cause the processor to get an indication that pieces of conceptual information have a conceptual proximity therebetween and storing in a database an indication of a relationship between the pieces of conceptual information.

According to an embodiment, the instructions further cause the processor to determine the number of pieces of conceptual information of the first user account having a relationship with pieces of conceptual information of the second user account, and use this number to determine at least one of the first compatibility fraction and the second compatibility fraction.

According to an embodiment, the pieces of conceptual information comprise user interests.

According to another aspect of the invention, there is provided a method for a server to suggest connecting a second user account to a first user account, the method comprising:

providing a server operably connected to a first client computer and to a second client computer;

receiving, by the server, an indication that the first client computer is to be associated to the first user account and an indication that the second client computer is to be associated to the second user account;

receiving, by the server, a plurality of strings indicative of a piece of conceptual information from the first client computer and a plurality of strings indicative of a piece of conceptual information from the second client computer;

receiving, by the server, an indication that pieces of conceptual information have a conceptual proximity therebetween and storing in a database an indication of a relationship between the pieces of conceptual information;

receiving, by the server, a first compatibility threshold from the first client computer and a second compatibility threshold from the second client computer, and storing in the database the first compatibility threshold and the second compatibility threshold;

compiling, by the server, the pieces of conceptual information that the second user account has in common with the first user account and the pieces of conceptual information of the second user account which have a relationship with the pieces of conceptual information of the first user account; and comparing with a total number of pieces of conceptual information associated to the first user account and the second user account to determine a first compatibility fraction and a second compatibility fraction;

determining whether the first compatibility fraction and the second compatibility fraction are above the first compatibility threshold and above the second compatibility threshold, respectively;

generating, by the server, a graphical user interface dataset and sending the graphical user interface dataset to the first client computer which, if the determining is positive, causes the first client computer to display:

an interface link, among other interface links appearing in the graphical user interface, suggesting a connection between the first user account and the second user account, the interface link having an appearance which is different from the other interface links; and a visual indication of at least one of the first compatibility fraction and the second compatibility fraction.

According to an embodiment, the pieces of conceptual information are user interests.

According to an embodiment, there is further provided identifying, by the server, at least one of:

a plurality of user accounts to which the first user account is connected; and a plurality of user accounts which share at least a given portion of the pieces of conceptual information of the first user account; and listing, by the server, the pieces of conceptual information to which the identified plurality of user accounts are linked.

According to an embodiment, there is further provided, upon listing, identifying, by the server, most redundant pieces of conceptual information to which plurality of user accounts are linked and to which the first user account is not linked, namely suggested pieces of conceptual information, wherein sending the graphical user interface dataset causes the first client computer to display:

an interface link suggesting a link to the suggested pieces of conceptual information among other interface links appearing in the graphical user interface, the interface link having an appearance which is different from the other interface links; and a visual indication of how redundant the suggested pieces of conceptual information are.

According to another aspect of the invention, there is provided a system for displaying a graphical user interface for presenting and suggesting connections to other users, the system comprising:

a client computer, associated to a first account, comprising a memory for storing a graphical user interface application, a communication device for communication over a network to a remote server, an input for receiving user input, an output operably connected to a display, and a processor operably connected to the memory, to the communication device, to the input and to the output, for executing the graphical user interface application, wherein the graphical user interface application causes the processor to:

receive a user input of a piece of conceptual information to which the first account is to be linked and a user input of a threshold;

send the piece of conceptual information to which the first account is to be linked and the threshold to the remote server;

receive a response signal from the remote server which is interpretable by the graphical user interface application, the response signal being based on the piece of conceptual information to which the first account is to be linked and the threshold, the response signal comprising information about a second account determined by the remote server as having a compatibility score above the threshold;

produce a graphical user interface which comprises:

an interface link suggesting a connection between the first account and the second account among the other interface links appearing in the graphical user interface, the interface link having an appearance which is different from the other interface links; and a visual indication of how much the compatibility score is above the threshold.

According to an embodiment, the graphical user interface is further for presenting interface links toward a suggested piece of conceptual information, wherein the response signal comprises information about the suggested piece of conceptual information, determined by the remote server as being correlated to the piece of conceptual information, the information comprising a redundancy of the suggested piece of conceptual information, wherein the graphical user interface application causes the processor to produce a graphical user interface which comprises:

an interface link, among other interface links in the graphical user interface, suggesting a link to the suggested piece of conceptual information, the interface link having an appearance which is different from the other interface links; and a visual indication of the redundancy of the suggested piece of conceptual information.

According to an embodiment, the pieces of conceptual information are user interests.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 6:
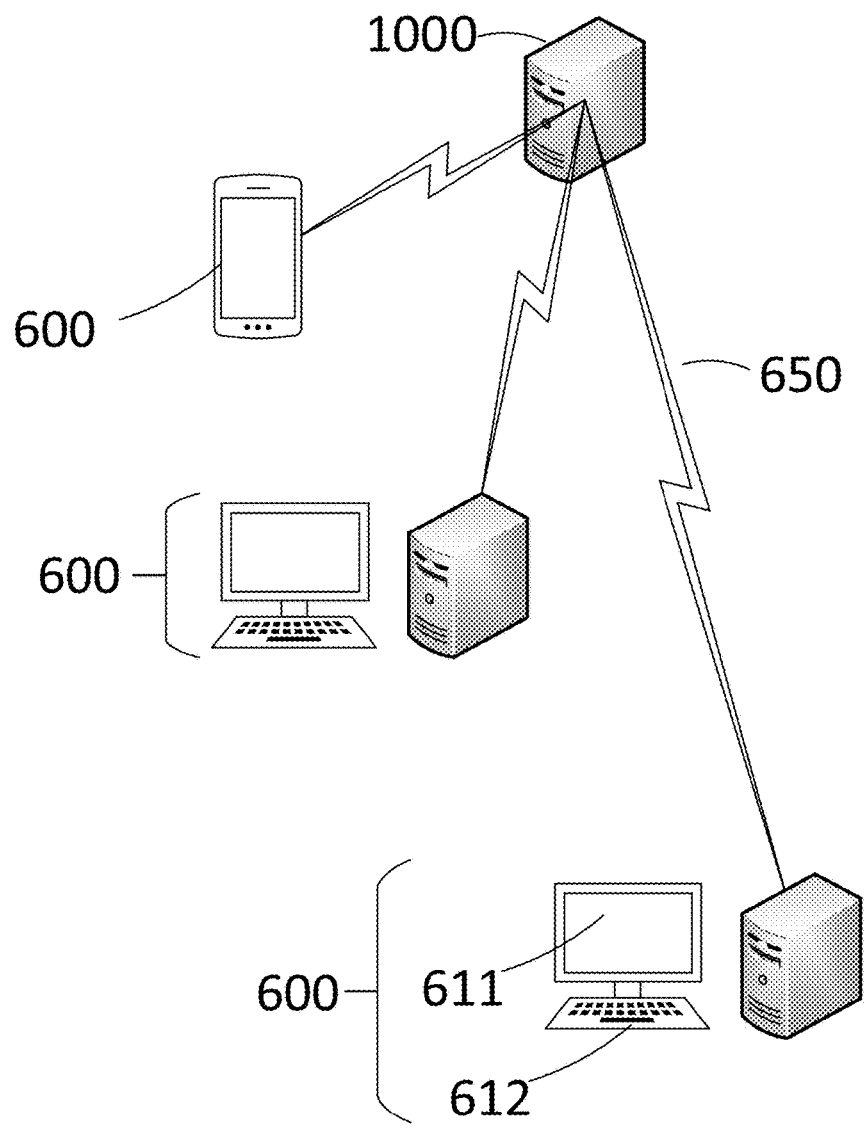
FIG. 6 is a block diagram illustrating a suitable computing environment enabling the graphical user interface, according to an embodiment.
Figure 7:
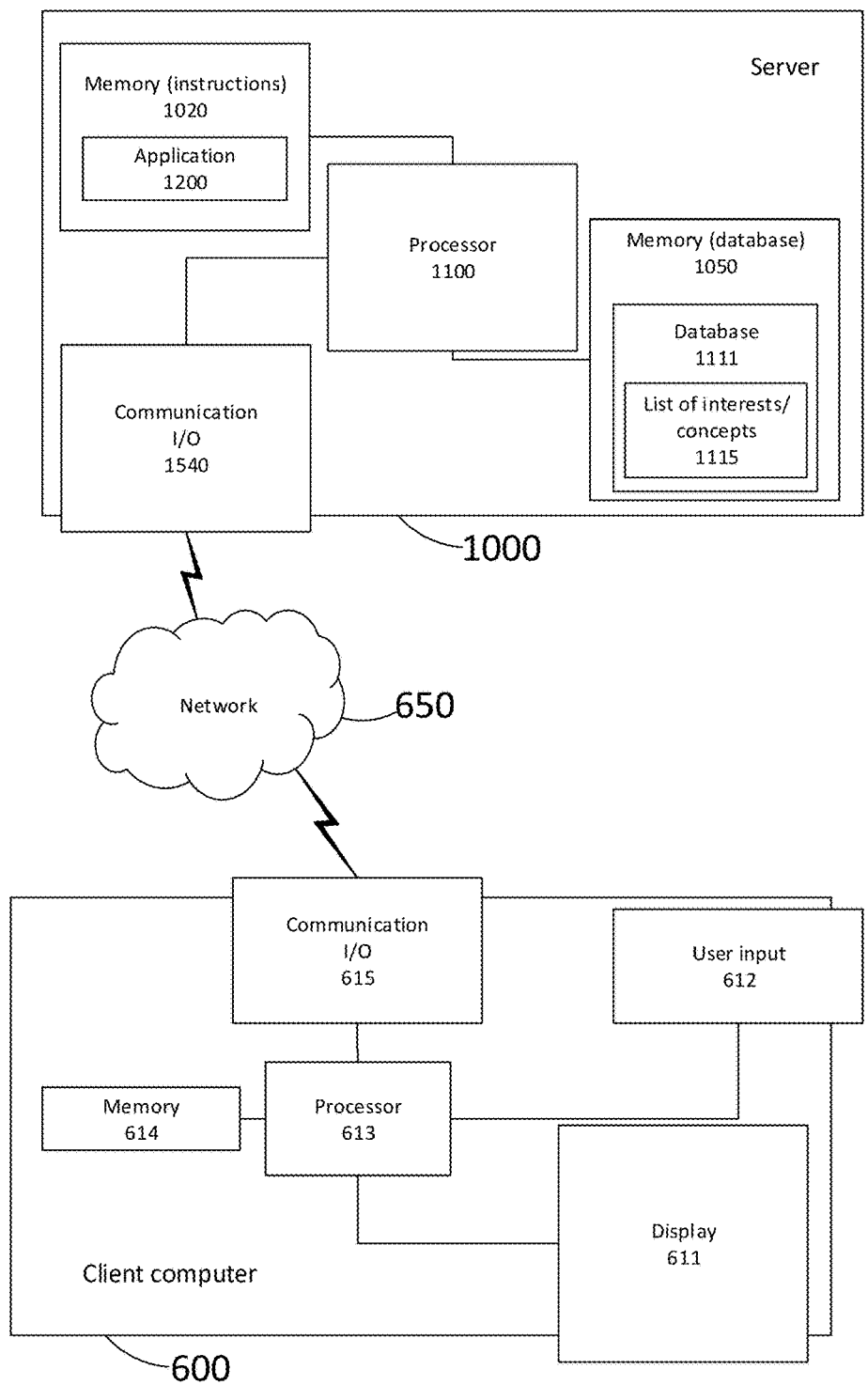
FIG. 7 is a block diagram illustrating a server and a client computer enabling the graphical user interface, according to an embodiment.

In embodiments shown in FIGS. 6 and 7, there are disclosed a graphical user interface displayable by a client computer 600 in communication with a server 1000, the server 1000 being for communication with a plurality of client computers 600, embodying a social network for networking with people sharing common interests, or more generally, being linked to the same concepts or to formally related concepts. A "concept" can also be referred to, in a more formal way, as a "piece of conceptual information".

A communication network 650 is provided to have a plurality of client computers 600 communicate with the communication module 1540 of a server 1000, as seen in FIGS. 6-7. The server 1000 is configured to identify a user account (simply referred to as an account) associated to each one of the client computers 600 at a given point in time (using a password and a user session, a cookie, etc.), receive input from the client computers 600, process the input in various ways as described hereinbelow, and, when requested by a given client computer associated to a given account, generate a signal corresponding to the given account. The signal carries information that is dependent upon the input from the client computers 600 and how it was processed by the server 1000. The signal can be sent over a network to the given client computer 600 associated to the given account. The signal is generated in a way that, when received by the given client computer 600, causes the given client computer 600 to automatically generate a graphical user interface which has a content and a structure which are determined by the signal. Therefore, the inputs provided by the plurality of client computers 600 into the server 1000 have the potential to cause a change in the content and structure of the graphical user interface of each one of the plurality of client computers 600.

The server 1000 comprises an account management and graphical user interface application 1200. This application is a set of instructions used by the processor 1100 to know how to manipulate account data, make decisions and build graphical user interface datasets. An account is a way of organizing a portion of the data stored on the database memory 1050 of the server 1000. For example, a portion of the database 1111 can be dedicated to a given account, or data is freely inserted in the database 1111 but tagged as belonging to a given account. Indeed, when users input data through the graphical user interface, the data is sent via the communication network 650 to the server 1000, where the processor 1100, based on the instructions it executes, categorizes the data as linked to the account of the user who inputted the data. When the data is stored in the database memory 1050, it is formally linked to the account, for example using a database entry.

The server 1000 is to be in communication with a plurality of client computers. When a client computer 600 initiates communication with the server 1000 through a given uniform resource locator (URL), the client computer will be required, according to the instructions stored on the database memory 1050 of the server 1000, to provide an identifier along its request to the server 1000 so the server can link, at least temporarily, the client computer 600 to a given account.

The database memory 1050 comprises a list of permissions for a given account. When a user uses a graphical user interface on a client computer 600 that has been identified as associated to a given account, the permissions define which data may be sent by the server 1000 to the client computer 600, and which data may not be sent thereto.

This list of permissions is built based on the activities performed by the client computer(s) 600 logged in on the given account and also on the activities performed by other client computers 600 which are logged in on other accounts. The list of permissions for a given account is the result of a complex combinations of operations performed on a variety of client computers 600.

For instance, a client computer 600 temporarily linked to a first account can be allowed to get data related to a second account if a formal permission has been granted by at least one of the users of the first account and of the second account, usually both, i.e., when a first user initiates a connection with a second user and the second user accepts it.

The client computer 600 is operably connected to a display 611 which can show the graphical user interface. An application, namely a graphical user interface application, installed on the client computer 600 (e.g., a web browser) is responsible for the rendering of the graphical user interface upon receiving a signal from the server 1000, the signal comprising the information necessary for the application to generate the graphical user interface as intended. The graphical user interface application is typically either a web browser that can interpret web page code (HTML, JavaScript, etc.), either a dedicated application (app or another software product) installed on the client computer 600.

The graphical user interface comprises information. The contents of the information that is shown, and the structure according to which it is shown, both depend on the data received by the server 1000 from the plurality of client computers 600.

The signal which is sent by the server 1000 to have the client computer 600 automatically generate a graphical user interface is adapted to have the graphical user interface adapted for both output (display to user using a display/screen) and input by the user, using a computer input (e.g., mouse, keyboard, touch screen, etc.).

The input on the graphical user interface comprises the input of information by the user related to their interests. This kind of data is interesting in that the server 1000. When dealing with that data, needs to process it in a particular way not found for other types of data. For instance, if a server 1000 was to process data about the level of connection between two users, or their belonging or not to a given group, this factual data is a number, a Boolean, etc. This kind of data is easily categorized by a server 1000. However, when a user inputs data about their interests, the data is not easily classifiable by the server 1000. The server 1000 is a machine that natively understands logical data, i.e., numbers and Booleans. However, having a server 1000 deal with conceptual information and draw links between different concepts requires that the server 1000 be instructed in a specific way.

Therefore, the server 1000 should be modified by installing on the memory 1020 instructions as to how to process the input of the user in order to produce the output (contents and structure of the graphical user interfaces).

The server 1000 receives the information in the form of strings (i.e., chains of characters). From the string, the server 1000 needs to link the string to conceptual information which is formalized as a variable stored in the database 1111. For example, if another user previously inputted a string that had no resemblance with any other concept-related string stored in the database 1111, the server will create a new instance of the conceptual information and associate the inputted string thereto. When the user inputs a string which is determined to have a resemblance the string stored in the database 1111 in relation to the given conceptual information, the server 1000 will send a signal which cause the graphical user interface to propose to the user if the conceptual information, embodied by the string already stored in the database, is the conceptual information that was meant. The user may refuse thereby creating a new instance of a conceptual information in the database associated to the newly inputted string, or may accept thereby creating a link between the account of the user to that conceptual information. A new string (the last one inputted) can be associated to that conceptual information and stored in the database 1111 as such.

Therefore, the database 1111 comprises a list of pieces of conceptual information 1115, the pieces of conceptual information comprising interests of the user. The list of pieces conceptual information 1115 comprises an ID for each piece of conceptual information and string(s) which describe the conceptual information. The list of pieces of conceptual information 1115 may comprise a link to the account of users who indicated, in the process described above, that they were related to that piece of conceptual information (i.e., they have that interest). Storing this link between a user and a piece of conceptual information can be done either in the list of pieces of conceptual information 1115, either in the user account, or in both.

An example of this process could be described as follows. A first user would be presented a graphical user interface prompting the user for one of their interest. The first user would type in "music". Let us assume that the list of pieces of conceptual information 1115 has no resembling string stored therein, the server, which would receive a signal from the client computer comprising that string ("music"), would create a new instance of an interest in the list of pieces of conceptual information 1115 and associate the string "music" thereto. A link between the account of the first user and between the conceptual information having the label "music" should be stored somewhere in the database 1111. When a second user would be presented a graphical user interface prompting them for one of their interest, they could enter "classical music". The server 1000, using instructions stored on the memory 1020, would compare the inputted string with other strings stored in the list of pieces of conceptual information 1115 and identify a resemblance. For example, a word in common between two strings would be considered by the server 1000 as a sufficient resemblance to trigger a user prompting. This user prompting comprises causing the graphical user interface to show the resembling string, "classical music" and ask the user to confirm whether or not this is what they meant. If the user selects "no" (or any equivalent thereof) on the graphical user interface, the server 1000 will, upon receiving the signal indicating this answer, create a new instance of an interest in the list of pieces of conceptual information 1115, with the string "classical music" associated thereto. A link between the account of the first user and between the piece of conceptual information having the label "music" should be stored somewhere in the database 1111. Otherwise, if the user selects "yes" (or any equivalent thereof) on the graphical user interface, the server will, upon receiving the signal indicating this answer, create a link between the account of the second user and between the piece of conceptual information having the label "music". The server 1000 can add the string "classical music" as associated to the piece of conceptual information having the label "music".

According to an embodiment, the graphical user interface can present a third option to the second user (the one who inputted "classical music"). The third option would allow the user to indicate that the interest they expressed as "classical music" is not the same as "music", but that they are closely related. In this case, the server 1000 will, upon receiving the signal indicating this answer, create a new instance of an interest in the list of pieces of conceptual information 1115, with the string "classical music" associated thereto. A link between the account of the first user and between the piece of conceptual information having the label "music" should be stored somewhere in the database 1111. Furthermore, the server 1000 will create a link between the two pieces of conceptual information, i.e., the one labelled "classical music" and the one labelled "music", to indicate that they are closely related. This link can be stored in a list of conceptual information relationships, or can be stored in the list of pieces of conceptual information 1115 for each of the appropriate pieces of conceptual information. Therefore, the distinction between related but distinct interests is kept, while indicating the relationship between them. The issue of having a computer not natively "understanding" pieces of conceptual information is thus addressed by having the server 1000 draw relationships between IDs of pieces of conceptual information, the relationships being proposed to users using string resemblance algorithms, and confirmed or infirmed by these users.

Before proceeding further with the description of the embodiments, a few definitions are proposed hereinbelow.

An interface link refers to an element of a graphical user interface which links two objects. For example, a link 18 is shown in FIG. 18, embodied as a line between a main user reference 12 and an object 16.

A link is what characterizes the relation between a user and pieces of conceptual information, i.e., entries in the list of pieces of conceptual information 1115. When a user indicates that they "like" a piece of conceptual information, or input an "interest" into the graphical user interface, a link is created and stored in the database. This link between a user and a piece of conceptual information can be stored either in the list of pieces of conceptual information 1115, either in the user account, or in both.

A connection is what characterizes the relation between two users who agreed to have their pieces of conceptual information (to which they are linked) shared between them. Various functions are enabled for users who are connected, such as communication functions.

A relationship is what characterizes the conceptual proximity between two concepts. Relationships characterize concepts that are different enough to be kept as distinct instances in the database 1111, but close enough to be provided with a formal pointing from one to the other one. The relationship is often confirmed by a user and stored in the database 1111. For example, the pieces of conceptual information "Mozart" and "classical music" are different enough to be kept separately in the list of pieces of conceptual information 1115 (a classical music lover is not necessarily a fan of Mozart), but would benefit from a formal relationship (since a fan of Mozart is by default an enthusiast listener of classical music).

A correlation is a statistical finding that users who are linked to a piece of conceptual information are more likely to be also linked to another piece of conceptual information. For example, 5% of all users may indicate that they like "golf" (they would then be linked to an ID of a piece of conceptual information labelled as "golf"). However, it may be found that among users who indicated that they like "luxury cars", 85% of them also indicate that they liked "golf", which is above the average. There is thus an observed correlation between the piece of conceptual information labelled as "golf" and the piece of conceptual information labelled as "luxury cars". There is no formal relationship, as defined above, between them. The observed correlation also imply that if a user likes "luxury cars" (i.e., their account is linked to the conceptual information labelled as "luxury cars"), this might be a good predictor that they also like golf. The server 1000 may identify such a correlation and suggest to user if they want to like (i.e., have their account linked to) the piece of conceptual information labelled as "golf".

A piece of conceptual information, or more simply a concept, is information that needs to be described and that is also better understood when relationships or comparisons with other "concepts" are made. The description of the "piece of conceptual information" may be a string (i.e., a word in computer terminology) that computers (in general) can manage and process. In the present description, the piece of conceptual information is also attributed an ID, which can be a number, a string, etc. The relationship can be represented by computers as pointers between two or more concepts. For example, the concept labelled as "cottage" (a string), is not understandable by a computer. If there are pointers (i.e., relationships) toward the IDs of other pieces of conceptual information, such as those labelled as "house", "vacation" and "countryside", a computer representation of the concept takes form. This better representation of relationships between concepts, also referred to as interests, helps in knowing which accounts have a better affinity. This better knowledge about potential compatibility is useful if social proximity is not used to estimate compatibility.

A graphical user interface (GUI) is an interface with which a user can interact. The graphical user interface needs a display (such as a screen, a monitor, etc.) so that the user can see what is displayed. Some input equipment (a pointing technology, such as a mouse or a touch screen technology, and/or a keyboard) is provided to allow the user to interact with elements of the GUI. Actions the user performs on the GUI triggers events in the computer which manages the GUI, thereby allowing human-computer interaction.

Figure 1:
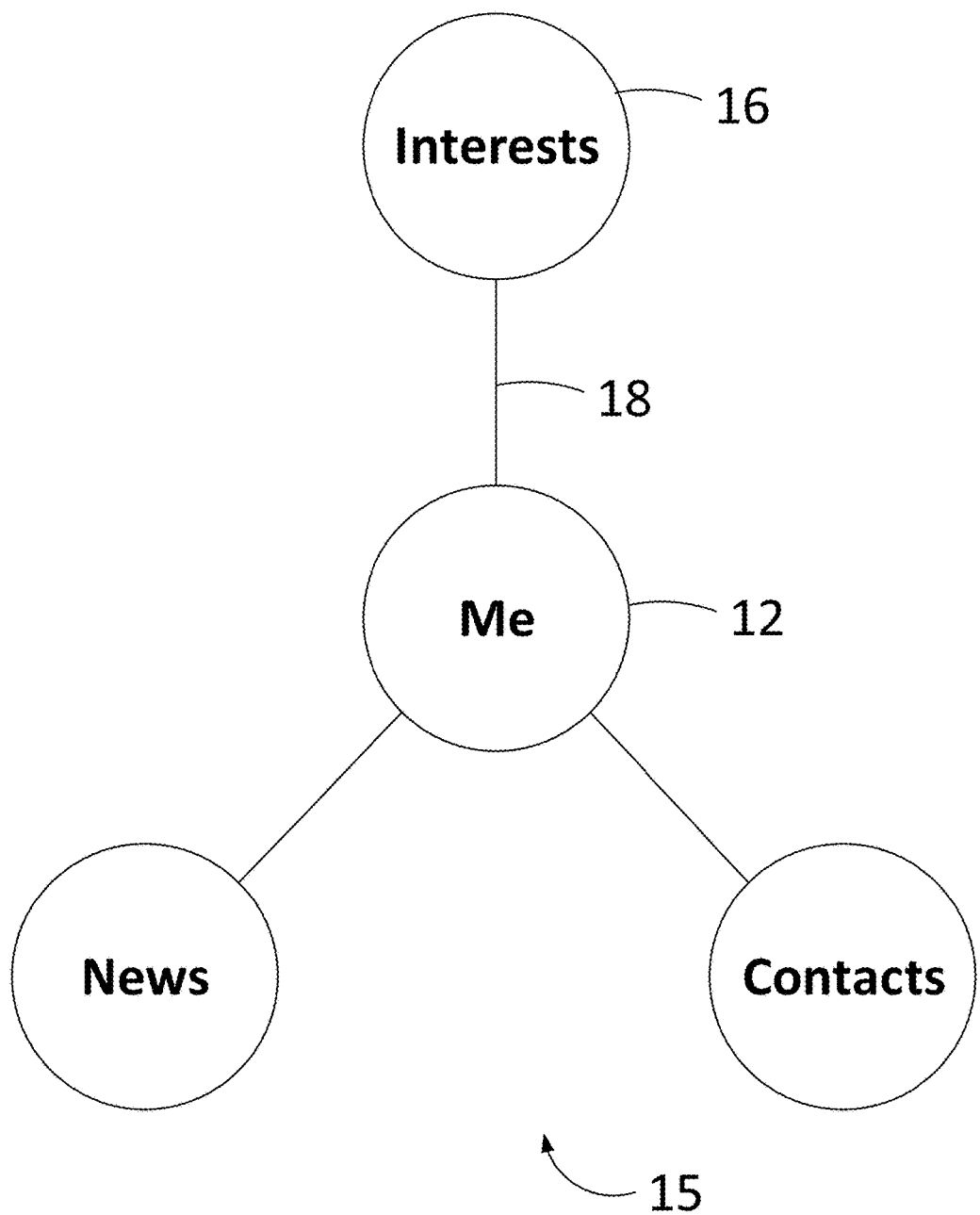
FIG. 1 is a block diagram illustrating a generic graphical user interface, according to an embodiment.

Referring now to the drawings of the graphical user interface as shown by a client computer 600, and more particularly to FIG. 1, a block diagram illustrates a generic graphical user interface 15, also known as a home graphical user interface, according to an embodiment. In practice, the client computer 600 prepares the graphical user interface based on a graphical user interface dataset received from the server 1000.

The generic graphical user interface 15 comprises a main user reference 12, lying in the center of the generic graphical user interface 15, around which interface links and interface objects are provided.

According to the embodiment shown in FIG. 1, the main user reference 12 comprises a personal tag identifying the person around whom interest objects, contact objects and news objects revolve. Those are objects 16, which are linked to the main user reference 12, shown in a central portion of the generic graphical user interface 15, via an interface link 18.

The generic graphical user interface 15 provides the user of the interface with navigation capabilities in categories identified in objects 16.

Figure 2A:
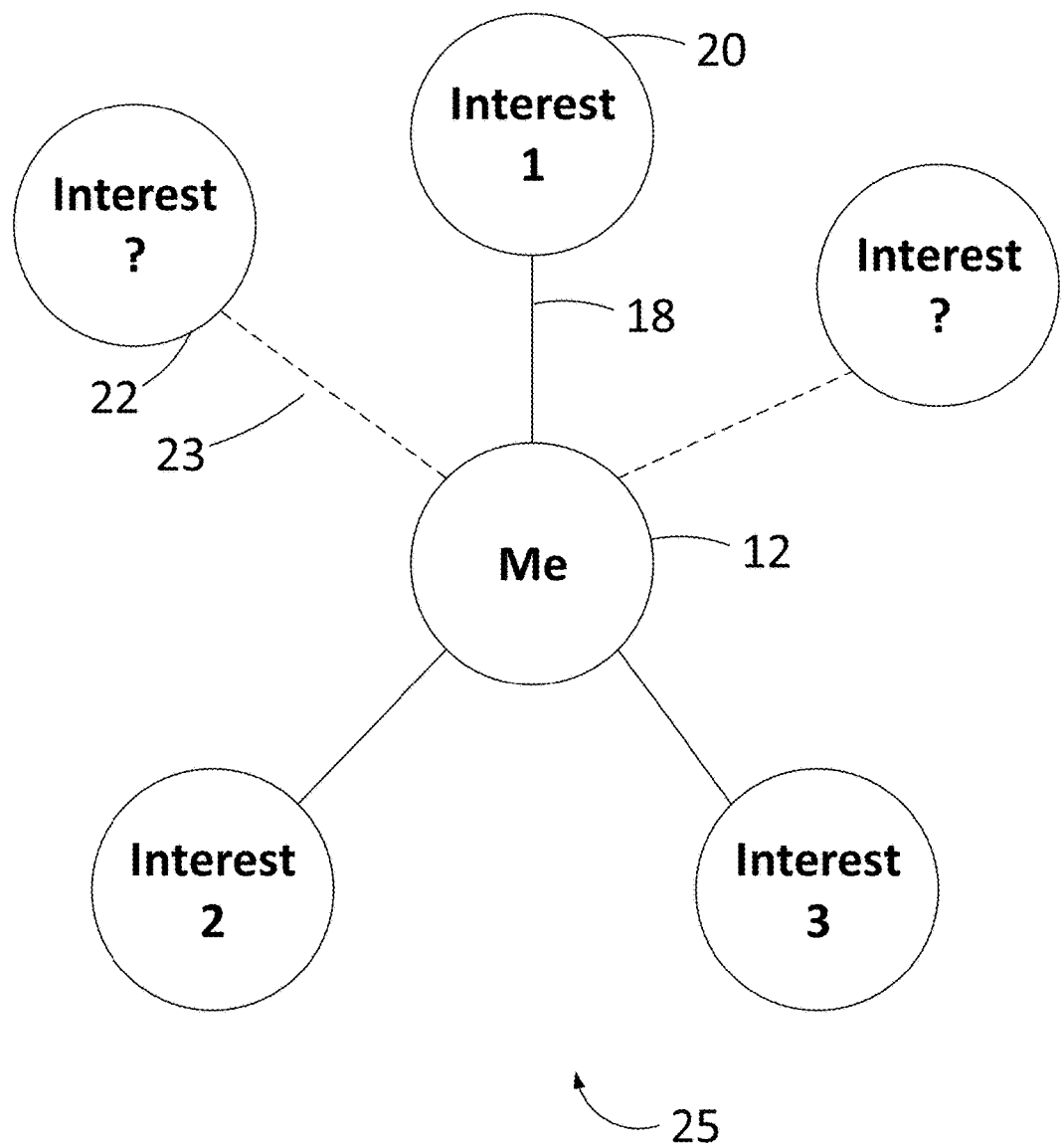
FIGS. 2A-2C are block diagrams illustrating embodiments of a graphical user interface for mapping and suggesting interests.

Now referring to FIG. 2A, there is shown an embodiment of an interface for mapping and suggesting interests accessed from the home graphical user interface of FIG. 1. This graphical user interface 25 is first used to map interests 20 that are linked via link 18 to the main user reference 12. These interests 20 are the real or actual interests of the user.

According to an embodiment, the graphical user interface 25 is adapted to suggest interests to the user. These suggested interests 22 are determined through a method which is described below in reference with FIGS. 4-5. The suggested interests 22 are shown on the graphical user interface 25. According to an embodiment, the suggested interests 22 are linked to the main user reference 12 at the center of graphical user interface 25 by a weakened link 23, such as a dotted line. The weakened link 23 helps users to see that these interests are not actual interests 20 but rather suggested interests 22.

Figure 2B:
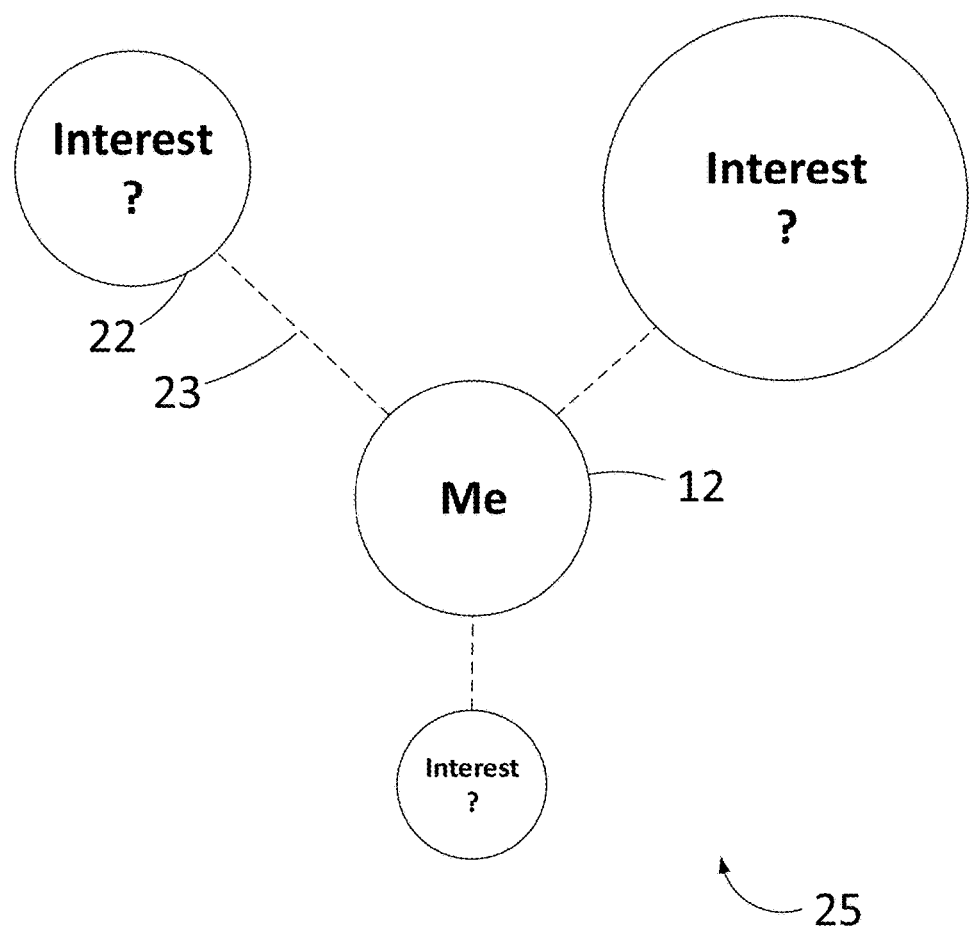

In FIG. 2B, there is detailed another embodiment of a graphical user interface 25 in which only suggested interests 22 are shown. These suggested interests 22 are sized according to the strength of the suggestion. If the suggested interest is determined to be of very high relevance, the size of the object presented in the interface is increased. Small-size objects are of a lesser relevance, although they are relevant enough to be presented as suggested interests 22. Other equivalent embodiments can be used, such increasing the visibility of the weakened link 23 (which could be made thicker, colored, longer or shorter, plain rather than dotted, etc.) or of the suggested interest 22 itself (colored or flashing object, thicker contours, etc.) to indicate that the suggestion is more relevant. A way to find which suggestions are more relevant is described below in reference with FIG. 5.

When the server 1000 sends the signal to the client computer 600, i.e., the graphical user interface dataset, the client computer 600 shall extract from the graphical user interface dataset attributes which characterize the weakened link 23 to be suggested. Therefore, there is a link attribute which specifies, either numerically or using a predefined category, that the link which is to be displayed is a weakened link 23, i.e., a suggested link which is not a concept to which the user is actually linked. The appearance of the link is thus different from other links on the interface which points toward interests to which the user is actually linked. The size of the suggested interests 22 is an indication of how redundant this interest is found in the list built for making suggestions (the process is explained further below). The server 1000 thus includes a link attribute in the graphical user interface dataset (to be sent to the client computer 600) which depends on this redundancy and will affect the size of this element in the graphical user interface 25.

Figure 2C:
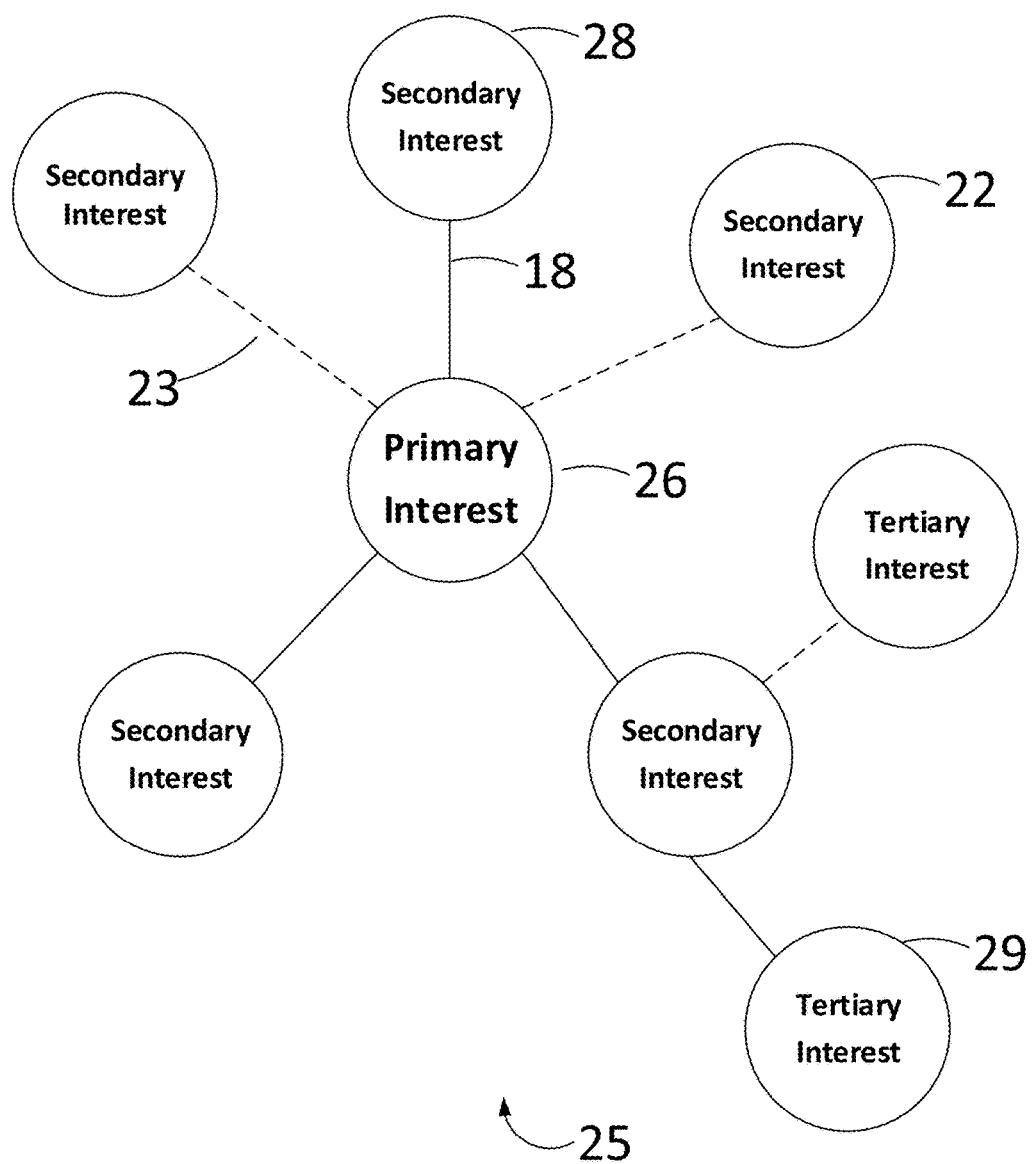

Now referring to FIG. 2C, there is shown another embodiment of a graphical user interface 25. In this embodiment, interests are depicted as hierarchized. This hierarchical structure departs from a primary interest 26. This primary interest can be related to other secondary interests 28. On the graphical user interface 25, they are displayed as linked by a link 18. Such as with the graphical user interface 25 shown in FIG. 2A, FIG. 2C shows suggested interests 22 can be provided around the primary interests or around the secondary interests, depending on which interest the suggestion is based, for example. Tertiary interests 29 are provided around secondary interests.

Links may exist between interests because they are inherently related, as indicated from a database. For example, a database could comprise the information that "books" and "literature" are intrinsically related interests. Another possibility is that users can indicate that interests they have are related among them.

For example, when users enter their new interest, for example "books", they may indicate that there is another related interest they wish to add, "literature" which will be related to book. If graphical user interface 25 of FIG. 2C is used, "books" is the primary interest 26 and "literature" is a secondary interest 28. However, if the user clicks or selects by any other means the secondary interest "literature", the graphical user interface 25 will change to display "literature" as the new primary interest 26 and "books" will become the new secondary interest 28. This type of interface modifications allows navigation through the interest tree.

Figure 3A:
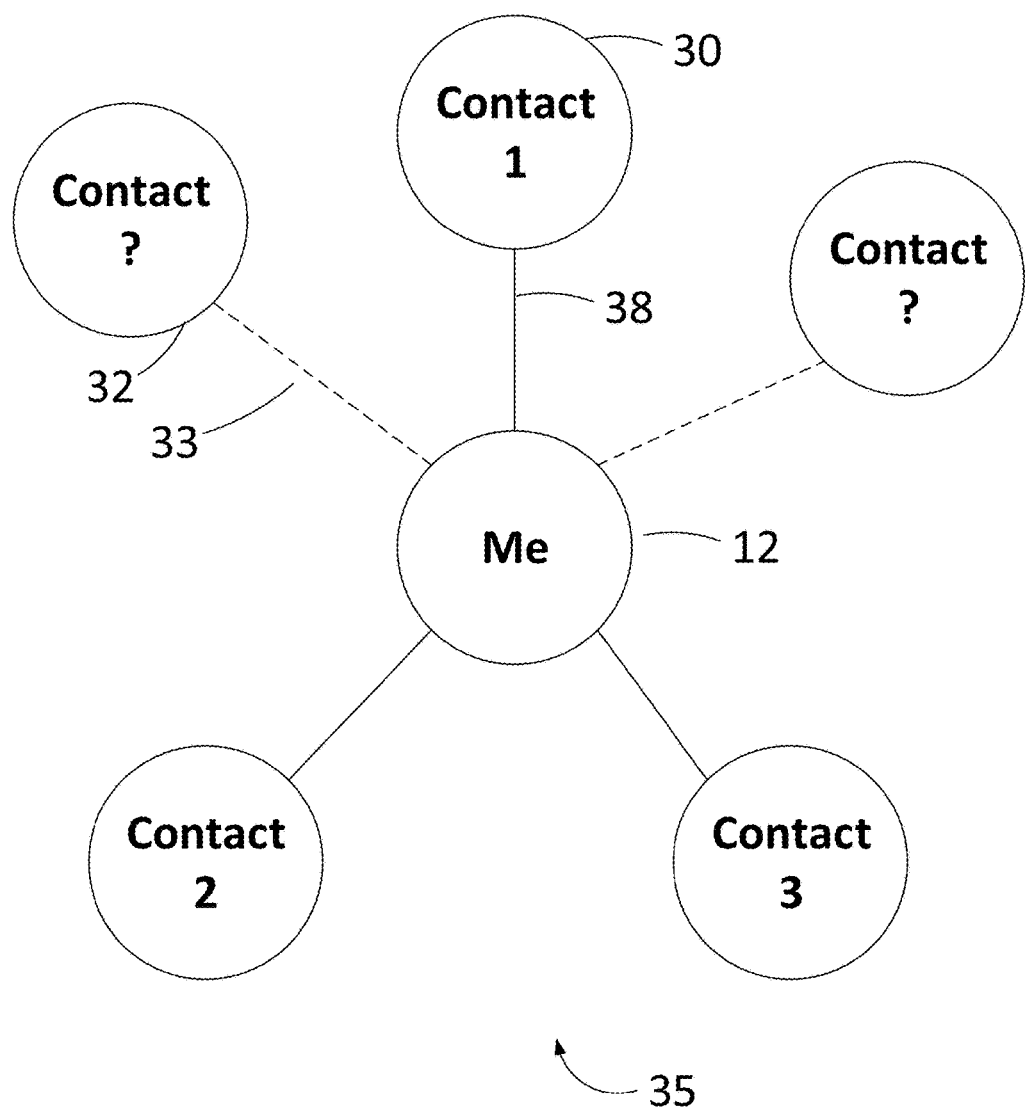
FIGS. 3A-3C are block diagrams illustrating embodiments of an contact interface for mapping and suggesting contacts.

FIG. 3A shows an embodiment of a contact interface 35 accessed from the home graphical user interface of FIG. 1 on the client computer 600. In practice, the client computer 600 prepares the graphical user interface based on a graphical user interface dataset received from the server 1000. The main or first user 12 is displayed at the center of the contact interface 35. The first user's actual contacts 30 are displayed around the first user 12, and they are linked by a link 38. Suggested contacts 32 are also shown. They are related to the first user 12 by a weakened link 33.

Suggested contacts and their strength are determined based on a method described below in reference to FIG. 4.

Figure 3B:
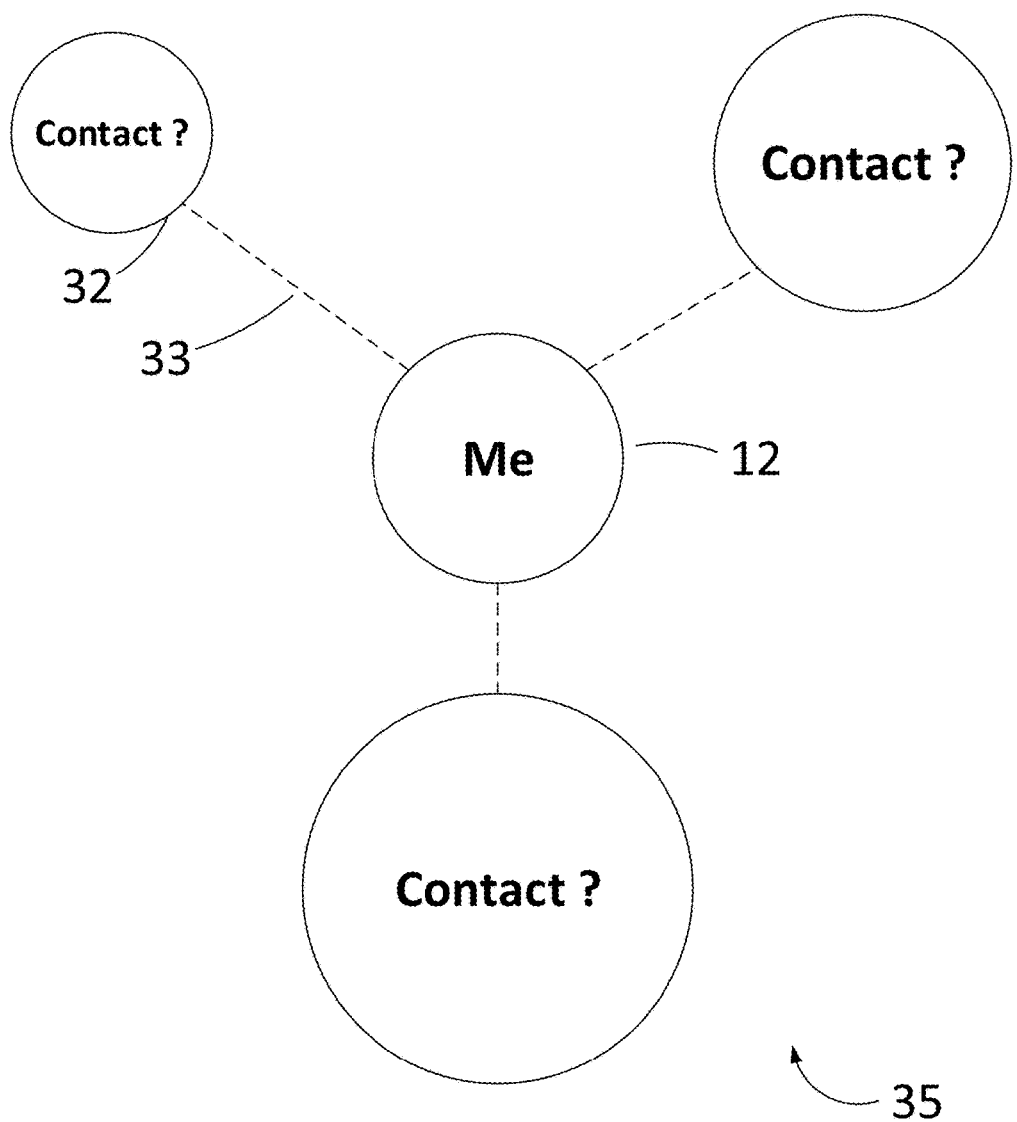

In FIG. 3B, there is shown another embodiment of a contact interface 35 in which only suggested contacts 32 are presented. The size of suggested contacts 32 changes depending on the strength of the suggestion. Alternatives are possible, as described above for suggested interests, involving the appearance of either the suggested contacts 32 or the weakened link 33. When the server 1000 sends the signal to the client computer 600, i.e., the graphical user interface dataset, the client computer 600 shall extract from the graphical user interface dataset attributes which characterize the link to be suggested. Therefore, there is a link attribute which specifies, either numerically or using a predefined category, that the link which is to be displayed is a weakened link 33, i.e., a suggested link which is not a contact to which the user is actually linked. The appearance of the link is thus different from other links on the interface which points toward contacts to which the user is actually connected. The size of the suggested contacts 32 is an indication to the user of the compatibility score (fraction F1 and/or F2) is high, or highly above the threshold. The compatibility scores (F1, F2) and threshold(s) will be discussed further below. For example, the link attribute which will be used to determine the size of the suggested contacts 32 can be an addition or multiplication of compatibility fractions, of how much the compatibility fractions are over their respective thresholds, or a value derived therefrom.

Figure 3C:
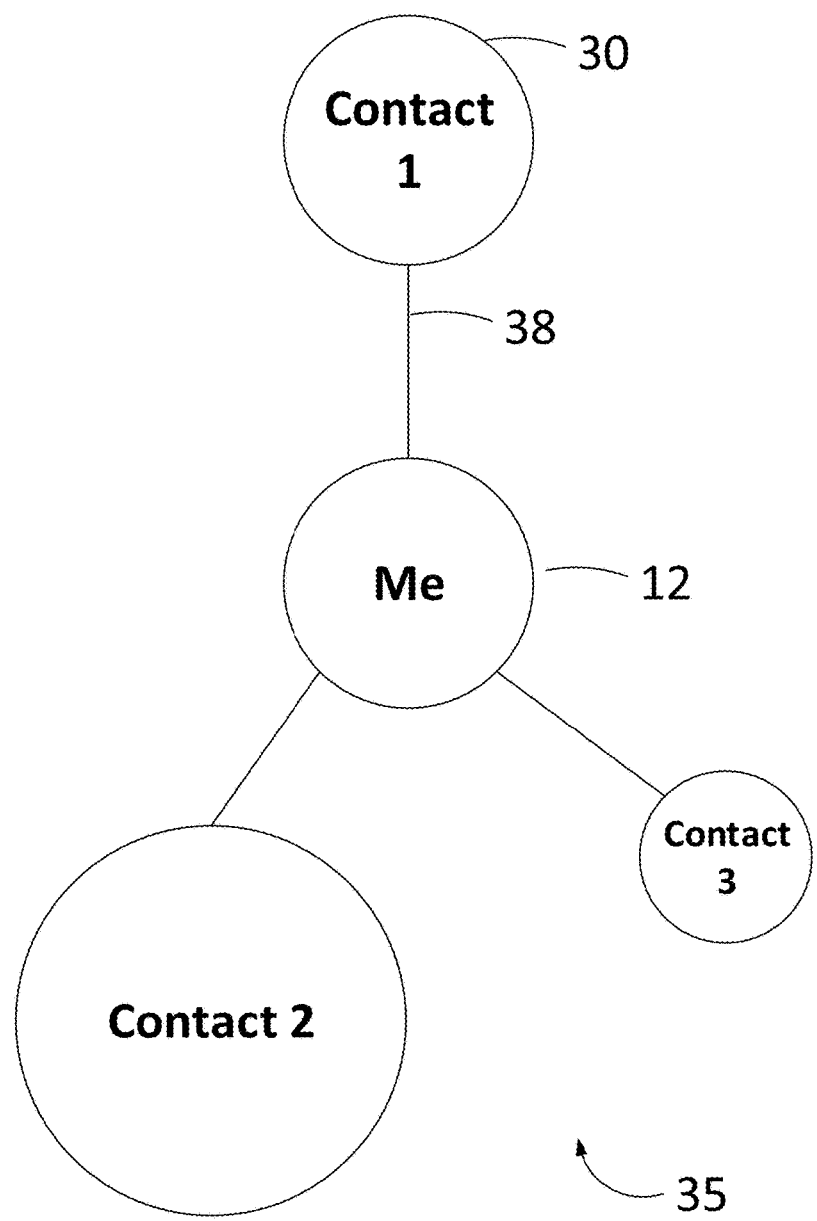

FIG. 3C is analog to FIG. 3B but shows only actual contacts 30 instead of suggested contacts 32. The strength of the link between actual contacts 30, transmitted by the server 1000 to the client computer 600 as link attributes in the graphical user interface dataset, is determined as for suggested contacts 32, according to the method described below in reference with FIG. 4.

A hierarchical tree of contacts can also be displayed, as it was shown for interests in FIG. 2C. In that case, the first user is at the center of the contact interface 35, and is directly related to his contacts. The following level is populated by contacts' contacts. Navigation is performed by clicking on people to bring them at the center of the contact interface 35, bringing third-level contacts to a second level on the contact interface 35, and so on.

Figure 4:
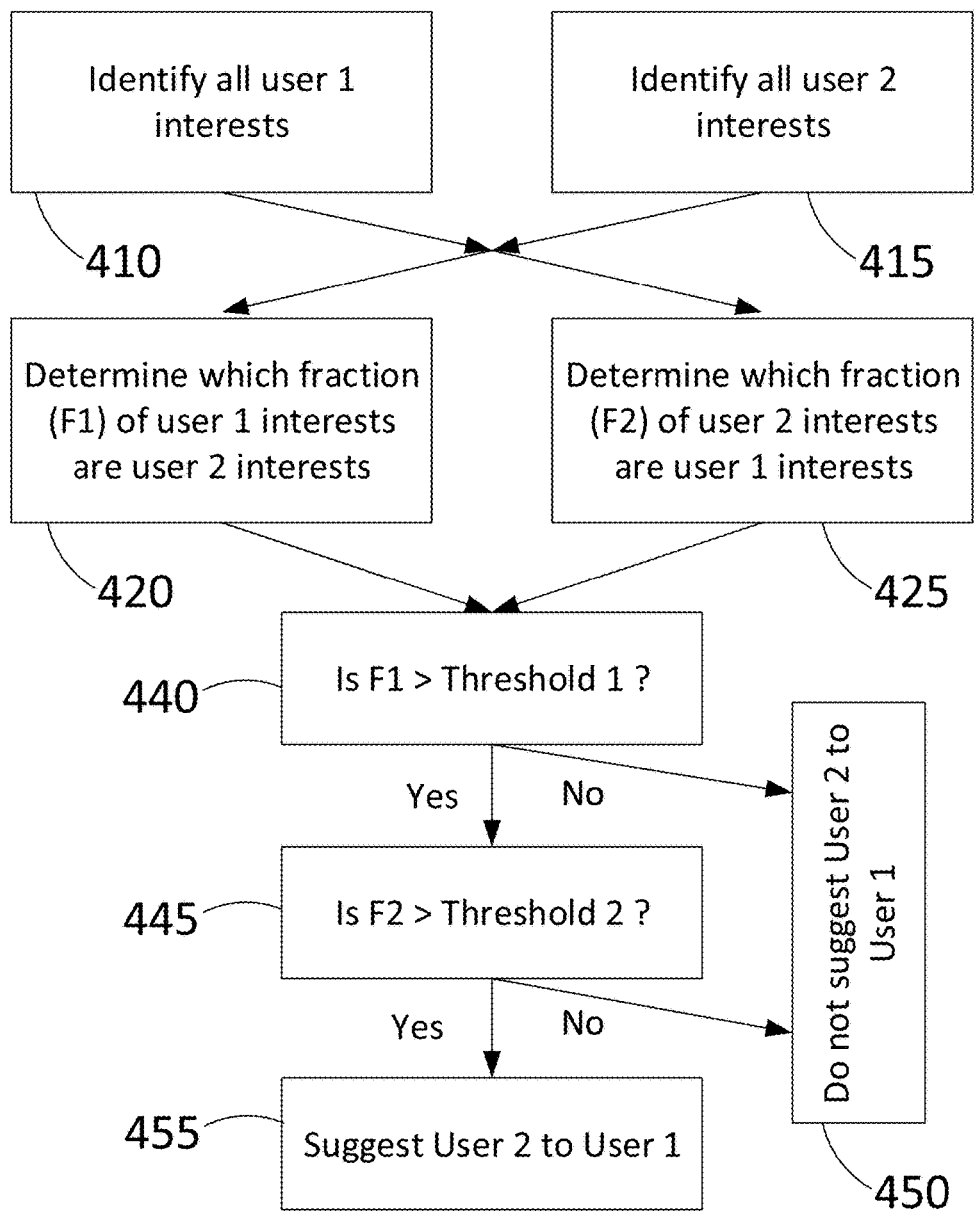
FIG. 4 is flowchart illustrating a method for suggesting a contact, according to an embodiment.

In reference with FIG. 4, there is described a method of suggesting new contacts to a main or first user based on the interests of the first user.

Among all users or a sub-group of all users, a second user is selected to determine compatibility with the first user (i.e., the first user interest compatibility and the second user interest compatibility).

All interests of the first user need to be determined (step 410). The same is performed for the second user (step 415).

Then, from the first user perspective, there is determined, by the processor 1100 of the server 1000 checking in the database 1111, how many of his/her interests are also actual interests of the second user (step 420). According to an embodiment, this is expressed as a fraction or proportion, namely F1 or first user interest compatibility.

According to an embodiment, looking for related interests can be used in addition to looking for the same interests. The relationship between concepts (e.g., interests) is already found in the database 1111, as concept data was previously analyzed by the server 1000 to check for such relationships or have them inputted by users or administrators of the system. Therefore, the server 1000 can look for all interests in the database 1111 which have a formal relationship with the interests of the first user, and determine how many of them are shared by the second user. Each related interest linked to the account of the second user can be counted as 1 (same weight as shared interests), or another value, thereby giving a different weight to related interests than to actual shared interests.

Thereafter, there is determined, by the processor 1100 of the server 1000 checking in the database 1111, how many of the second user's interests are also actual interests of the first user (step 425). According to an embodiment, this is expressed as a fraction or proportion, namely F2 or second user interest compatibility.

According to an embodiment, the server 1000 also uses related interests, as detailed above, when determining F2.

Table 1 shows an example of interests of a first user and a second user, and how the fractions would be calculated in each case.

TABLE 1

Interest comparison between a first user and a second user

| User 1 Interests | User 2 Interests |
| --- | --- |
| Literature | Literature |
| Ski | Fashion |

TABLE 1-continued

Interest comparison between a first user and a second user

| User 1 Interests | User 2 Interests |
|---|---|
| Politics | Food |
| — | Ski |
| — | Travel |
| — | Movies |
| F1 = 2/3 = 66% | F2 = 2/6 = 33% |

Table 2 shows an example of interests of a first user and a second user, and how the fractions would be calculated in each case by taking into account related interests with the same weight as shared interests.

TABLE 2

Interest comparison, including related interests, between a first user and a second user

| User 1 Interests | User 2 Interests |
|---|---|
| Literature | Literature |
| Ski | Fashion |
| Clothing | Food |
| — | Ski |
| — | Travel |
| — | Movies |
| F1 = 3/3 = 100% | F2 = 3/6 = 50% |

Table 3 shows an example of interests of a first user and a second user, and how the fractions would be calculated in each case by taking into account related interests a weight different from that of shared interests (For ex., clothing vs. the related concept of fashion is worth only 50% of a shared interest).

TABLE 3

Interest comparison, including related interests, between a first user and a second user

| User 1 Interests | User 2 Interests |
|---|---|
| Literature | Literature |
| Ski | Fashion |
| Clothing | Food |
| — | Ski |
| — | Travel |
| — | Movies |
| F1 = 2.5/3 = 83.33% | F2 = 2.5/6 = 41.66% |

As seen from the example shown in Table 1, even though the first and the second users share two interests, the fraction of their own interests that is shared by the counterpart is not the same in each case. The second user would seem like a good match to the first user, since the second user shares two out of three interests of the first user (F1=66%). However, the first user does not seem like a good match to the second user, since the first user shares only two out of six interests of the first user (F2=33%).

To take advantage of this asymmetry, the user may select in its settings two compatibility thresholds. The first compatibility threshold, or simply the first threshold, T1, is the minimum fraction F1 for which someone (another user) may be suggested to him (the user). The second compatibility threshold, or simply the second threshold, T2, is the minimum fraction F2 for which the second user accepts to be suggested to the first user. In other words, the second compatibility threshold, T2, is the minimum fraction F2 for which a user accepts to be suggested to another user.

If F1>T1 and F2>T2 for a given second user, that second user will be suggested to the first user. Therefore, if F1 is determined to be greater than T1 (step 440) and if F2 is determined to be greater than T2 (step 445), the second user is suggested to the first user (step 455). Otherwise, the second user will not be suggested to the first user (step 450).

Based on the example presented above in Table 1, Table 4 presents the result (suggestion or no suggestion) depending on various compatibility threshold values. The same process applies if related interests are considered.

TABLE 4

Suggestion results vs. compatibility threshold values

| User 1 selects T1 as . . . | User 2 selects T2 as . . . | Suggestion (Yes/No) |
|---|---|---|
| 70% (F1 < T1) | 40% (F2 < T2) | No |
| 60% (F1 > T1) | 30% (F2 > T2) | Yes |
| 70% (F1 < T1) | 30% (F2 > T2) | No |
| 60% (F1 > T1) | 40% (F2 < T2) | No |

Therefore, suggesting to a first user a contact with a second user happens if and only if their respective proportion of interests they share with respect to the other one is above the respective compatibility threshold set for each one of them, as determined by the server 1000.

The whole comparison is performed in an automated way to provide fast and efficient comparison. It is performed iteratively among all users of the network or of a given sub-group of the network to identify all compatible users to be suggested.

According to an embodiment, a user can select, on the graphical user interface, options that downgrade compatibility between him/her and a second user. For example, the first user may select smoking as a repulsive interest, and a second user having it as an interest would have a compatibility fraction F1 downgraded by a given percentage. Other types of equivalent "penalties" can be applied, for example by multiplying F1 by a given fraction to get a new reduced F1. The second user can also be completely excluded from suggestion to the first user.

According to an embodiment, if there are too many second users who can be suggested to the first user, the list of compatible second users can be kept for future reference or suggestion to the first user. Only a part of the compatible second users can be displayed for suggestion to the first user, while others names are delayed for a later suggestion.

According to an embodiment, fractions F1 and/or F2 are used to determine the strength of a suggestion. Alternatively, the relation between F1 and T1 and/or the relation between F2 and T2 are used to determine the strength of a suggestion. The strength of the suggestion can be used to differentiate suggestions as shown in FIG. 3B.

More specifically, a compatibility score can be determined (i.e., computed) by the server 1000 in various ways. The compatibility score can be an addition of F1 and F2, an average of F1 and F2, a multiplication of F1 and F2, or simply F1 or F2. It can also be an addition of (F1-T1) (how much fraction F1 is over the first threshold) and (F2-T2) (how much fraction F2 is over the second threshold), an average of (F1-T1) and (F2-T2), a multiplication of (F1-T1) and (F2-T2), or simply (F1-T1) or (F2-T2). Other variants or combinations can be contemplated as long as the compatibility score increases with a fraction or with how much a fraction exceeds its corresponding threshold. After having computed the compatibility score, the server 1000, when producing a user interface dataset, will include link attributes in this document. This link attributes will be used to determine the appearance of the suggested contact on the GUI. The link attributes will thus generate a visual indication (e.g., an increased size, a different shape, etc.) on the GUI, to indicate to the user the strength of the suggestion (i.e., if the compatibility score is high). The overall appearance of the suggested link should be based on the link attributes to specify that this is a suggestion (i.e., there should be a weakened link 33 as described above and shown in FIG. 3B).

Figure 5:
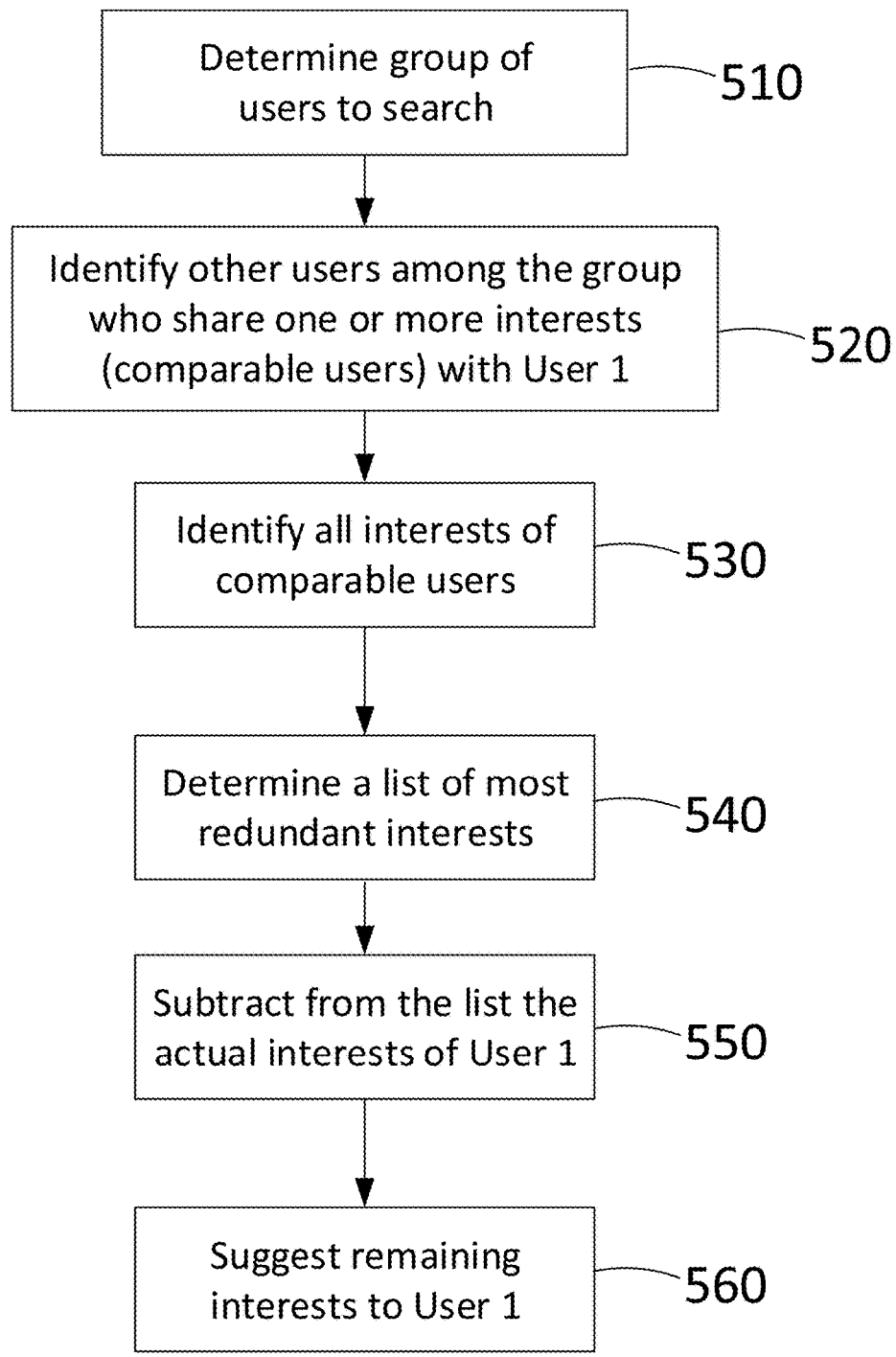
FIG. 5 is a flowchart illustrating a method for suggesting interests to a user, according to an embodiment.

In reference with FIG. 5, there is described a method of suggesting new interests to a client computer 600 associated to the account of a user. First, a reference group is identified (step 510) by the server 1000. This reference group can be every user of the whole network, or a sub-group thereof, or only the actual contacts of the first user and/or the contacts suggested to the first user.

Among all users of the reference group, all users sharing at least one interest with the first user are identified (step 520) by the server 1000. A second user sharing at least one interest with the first user is considered as comparable. According to another embodiment, these users are considered as comparable if they share more than a specific number of interests (e.g., 5 or 10 interests) in order to decrease the number of comparable users or to have comparable users which are more relevant.

According to an embodiment, each one of the comparable user is given a weight depending on the number of interest shared with the first user.

At step 530, all interests (or a portion thereof) of comparable users are gathered by the server 1000. Most redundant interests are listed (step 540). According to an embodiment, they are listed in an order which is representative of how redundant they are (i.e., how many times they are repeated in the set of interests of comparable users). A threshold for the redundancy of the interest to be presented to the user may be set by the operator of the system or by the user himself. This way, all interests from comparable users are not proposed to the user on the graphical user interface 25, but only interests which meet a certain threshold of repetitiveness (i.e., the most redundant ones) among the comparables users.

According to an embodiment, the server 1000 further searches for all interests which have a formal relationship with the actual interests of the user (i.e., similar concepts). This is done using the relationships as defined above. This allows the server 1000 to widen the field of search to other areas which are not the same but are similar enough to be worth looking for. The server 1000 will be able to produce a suggestion of these related concepts to the user for display in the graphical user interface displayable by the client computer 600. Alternatively, the suggestion will include related interests to identify comparable users in step 520, so the pool of comparable users is larger.

The previous steps are used to see the overall interests of comparable users (i.e., users who share at least one or some of a first user's interests). Since the goal is to suggest new interests to the first user, the actual interests of the first user, if any, are removed from the list of most redundant interests among comparable users (step 550). The remaining interests in that list are the interests that are the most common among comparable users but which are not interests of the first user. They can thus be suggested to the first user (step 560).

According to an embodiment, depending on the rank of the suggested interest listed in step 540 (if they are listed in a decreasing order of redundancy; i.e., the first items in the list are the most redundant interests), the strength of the suggestion varies. This is shown in FIG. 2B, in which the size of suggested interests 22 (aka objects) on the graphical user interface 25 is dependent upon the strength of the suggestion. After having determined the most redundant interests, the server 1000, when producing a user interface dataset, will include link attributes in this document. This link attributes will be used to determine the appearance of the suggested link on the GUI. The link attributes will thus generate a visual indication (e.g., an increased size, a different shape, etc.) on the GUI, to indicate to the user the strength of the suggestion (i.e., if the compatibility score is high). The overall appearance of the suggested link should be based on the link attributes to specify that this is a suggestion (i.e., there should be a weakened link 23 as described above and shown in FIG. 2B).

Once users have a network of contacts and interests, they can receive news or read a newsfeed which is in accordance with those contacts and interests.

According to an embodiment, measures are taken to ensure that the network is anonymous. When a user connects with a new one, an anonymous communication takes place. The anonymous communication ensures that people who do not want to be recognized stay anonymous. Other measures can be taken to make sure user profiles stay anonymous. For example, a no profile picture policy can be enforced. Furthermore, when a first user looks at a second user's profile, only their common interests are displayed. If all interests of the second user were displayed, a first user could modify his interests to gain access to the second user (because their shared interests would be above both compatibility thresholds). Therefore, a first user cannot deliberately falsify his interests to attain a specific second user.

According to an embodiment, various functions such as chat rooms and messaging are available within the platform.

According to an embodiment, a newsfeed interface is provided to inform the user on his or her interests.

According to an embodiment, there is provided an interface for adding new interests. Those new interests can be marked as related to another existing interest, as mentioned above.

According to an embodiment, there is provided an interface for setting compatibility threshold for suggestion, T1 and T2.

According to an embodiment, establishing a new connection can only be done if a second user is suggested to the first user. If shared interests are below set compatibility thresholds, connection is prevented by the platform. Therefore, suggestion of a second user is synonym with allowance of a connection.

In order to enable the graphical user interfaces and the methods described above, it is necessary to use a suitable computing environment, as described below in reference with FIG. 6.

The necessary computing environment needs to be able to provide essential functions such as data communication between users and user interaction with the interface. The embodiment shown in FIG. 6 provides those functions by using a server 1000 (shown as a remote server) in communication with the first client computer 600 allowing the first user to use the interface and with other client computers 600 to allow other users to interact with the interface.

According to an embodiment and as shown in FIG. 7, a client computer 600 comprises a display 611 to show to interface to a user, a keyboard and/or mouse and/or touch screen capability, more generally a user input 612, to allow the user to select and/or enter information, a communication device 615 (for input/output) to exchange information with the server 1000 using a communication network 650, a memory 614 to stock data (either temporarily or permanently), including instructions for the method, and a processor 613 to execute those instructions. The processor 613 may comprise a CPU and a graphics processing unit (also known as a graphics card) separate from the CPU to produce a GUI more efficiently. The client computer 600 works in combination with the server 1000 by sending requests, through a request signal, to the server 1000. The server 1000 processes the request signal to determine the appropriate response, and sends a response signal to the computer 600, which can interpret the response signal.

The client computer 600 may take the form of a table-top computer, laptop computer, smartphone or any other known computing device known to perform the same functions.

This computing environment offers a physical support for fast data communication, fast similarity recognition to suggest interests or contacts, ability to identify relevant information based on the actual interests and remote communication between distant users.

Anonymous communications are also enabled by the use of a computing environment, which allows people to hide their visible identity (physical appearance, voice) and other distinctive traits (such as location, friends) under a pseudonym, thereby allowing each user to be identified solely by the interests they have in common with someone else.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for generating a graphical user interface for display by a client computer, the system comprising:
   a server comprising a communication input/output (I/O) for communicating with a plurality of client computers, a database memory for storing a database, a memory for storing instructions thereon, and a processor operably connected to the communication I/O, the database memory and the memory for storing instructions, the instructions causing the processor to:
     receive, at the communication I/O, an indication that a first client computer is to be associated to a first user account;
     get in the database memory a plurality of pieces of conceptual information and a first threshold associated to the first user account and selected by a first user on the first user account, and a plurality of pieces of conceptual information and a second threshold associated to a second user account and selected by a second user on the second user account;
     determine how different ones of the pieces of conceptual information are related and storing a result of the determining in a relationship database;
     determine if a sum of a number of pieces of conceptual information that the first user account and the second user account have in common and of a number of pieces of conceptual information of the first user account and of the second user account which have a relationship therebetween according to the relationship database, relative to a total number of pieces of conceptual information associated to the first user account and the second user account, namely a first compatibility fraction and a second compatibility fraction, both exceed the first threshold and the second threshold, respectively;
     generate a graphical user interface dataset and sending the graphical user interface dataset to the first client computer which, if the determining is positive, causes the first client computer to display:
       a visual interface link, among other visual interface links appearing in the graphical user interface, visually suggesting a connection between the first user account and the second user account, the visual interface link having an appearance which is different from the other visual interface links; and
       a visual indication of at least one of the first compatibility fraction and the second compatibility fraction.

2. The system of claim 1, wherein the pieces of conceptual information comprise user interests.

3. A method for a server to suggest connecting a second user account to a first user account, the method comprising:
   providing a server operably connected to a first client computer and to a second client computer;
   receiving, by the server, an indication that the first client computer is to be associated to the first user account and an indication that the second client computer is to be associated to the second user account;
   receiving, by the server, a plurality of strings indicative of a piece of conceptual information from the first client computer and a plurality of strings indicative of a piece of conceptual information from the second client computer;
   receiving, by the server, an indication that pieces of conceptual information have a conceptual proximity therebetween and storing in a database an indication of a relationship between the pieces of conceptual information;
   receiving, by the server, a first compatibility threshold from the first client computer and selected by a first user on the first user account, and a second compatibility threshold from the second client computer and selected by a second user on the second user account, and storing in the database the first compatibility threshold and the second compatibility threshold;
   determining how different ones of the pieces of conceptual information are related and storing a result of the determining in a relationship database;
   identifying, by the server;
     the pieces of conceptual information that the second user account has in common with the first user account; and
     the pieces of conceptual information of the second user account which have a relationship with the pieces of conceptual information of the first user account, from the relationship database; and—
   comparing with a total number of pieces of conceptual information associated to the first user account and the second user account to determine a first compatibility fraction and a second compatibility fraction, wherein the total number of pieces of conceptual information associated to the first user account and the second user account is based on both the pieces of conceptual information in common and having the relationship from the relationship database;
   determining whether the first compatibility fraction and the second compatibility fraction are above the first compatibility threshold and above the second compatibility threshold, respectively;

generating, by the server, a graphical user interface dataset and sending the graphical user interface dataset to the first client computer which, if the determining is positive, causes the first client computer to display:
- a visual interface link, among other interface links appearing in the graphical user interface, visually suggesting a connection between a visual representation of the first user account and a visual representation of the second user account, the visual interface link having an appearance which is different from the other interface links; and
- a visual indication of at least one of the first compatibility fraction and the second compatibility fraction.

4. The method of claim 3, wherein the pieces of conceptual information are user interests.

5. The method of claim 3, further comprising identifying, by the server, at least one of:
- a plurality of user accounts to which the first user account is connected; and
- a plurality of user accounts which share at least a given portion of the pieces of conceptual information of the first user account; and listing, by the server, the pieces of conceptual information to which the identified plurality of user accounts are linked.

6. The method of claim 5, further comprising, upon listing, identifying, by the server, most redundant pieces of conceptual information to which plurality of user accounts are linked and to which the first user account is not linked, namely suggested pieces of conceptual information, wherein sending the graphical user interface dataset causes the first client computer to display:
- an interface link suggesting a link to the suggested pieces of conceptual information among other interface links appearing in the graphical user interface, the interface link having an appearance which is different from the other interface links; and
- a visual indication of how redundant the suggested pieces of conceptual information are.

7. A system for displaying a graphical user interface for presenting and suggesting connections to other users, the system comprising:
- a client computer, associated to a first account, comprising a memory for storing a graphical user interface application, a communication device for communication over a network to a remote server, an input for receiving user input, an output operably connected to a display, and a processor operably connected to the memory, to the communication device, to the input and to the output, for executing the graphical user interface application, wherein the graphical user interface application causes the processor to:
  - receive a user input of a piece of conceptual information to which the first account is to be linked;
  - receive a user input of a threshold, selected by the user input on the graphical user interface;
  - send the piece of conceptual information to which the first account is to be linked and the threshold to the remote server, thereby triggering at the remote server a step of determining how the piece of conceptual information is related to other pieces of conceptual information and storing a result of the determining in a relationship database;
  - receive a response signal from the remote server which is interpretable by the graphical user interface application, the response signal being based on the piece of conceptual information to which the first account is to be linked and the threshold, the response signal comprising information about a second account determined by the remote server as having a compatibility score above the threshold, wherein the compatibility score is determined from a number of pieces of conceptual information that the first account and the second account have in common and of a number of pieces of conceptual information of the first account and of the second account which have a relationship therebetween according to the relationship database;
  - produce a graphical user interface which comprises:
    - a visual interface link visually suggesting a connection between the first account and the second account among the other visual interface links appearing in the graphical user interface, the visual interface link having an appearance which is different from the other visual interface links; and
    - a visual indication of how much the compatibility score is above the threshold.

8. The system of claim 7, wherein the graphical user interface is further for presenting visual interface links toward a suggested piece of conceptual information, wherein the response signal comprises information about the suggested piece of conceptual information, determined by the remote server as being correlated to the piece of conceptual information, the information comprising a redundancy of the suggested piece of conceptual information, wherein the graphical user interface application causes the processor to produce a graphical user interface which comprises:
- a visual interface link, among other visual interface links in the graphical user interface, visually suggesting a link to the suggested piece of conceptual information, the visual interface link having an appearance which is different from the other visual interface links; and
- a visual indication of the redundancy of the suggested piece of conceptual information.

9. The system of claim 8, wherein the pieces of conceptual information are user interests.

* * * * *